(12) United States Patent
Rashid et al.

(10) Patent No.: US 7,289,448 B2
(45) Date of Patent: Oct. 30, 2007

(54) PATH ENGINE FOR OPTICAL NETWORK

(75) Inventors: Hasnain Rashid, Menlo Park, CA (US); Masood Ahmad, Santa Clara, CA (US); Paddy Vishnubhatt, Los Alto, CA (US); Phyllis Yip, San Francisco, CA (US); Jason C. Fan, Mt. View, CA (US); Peter G. Jones, Campbell, CA (US); Saravanan R. Coimbatore, Sunnyvale, CA (US)

(73) Assignee: Adtran, Inc., Huntsville, AL (US)

( * ) Notice: Subject to any disclaimer, the term of this patent is extended or adjusted under 35 U.S.C. 154(b) by 733 days.

(21) Appl. No.: 10/745,763

(22) Filed: Dec. 23, 2003

(65) Prior Publication Data

US 2005/0135804 A1    Jun. 23, 2005

(51) Int. Cl.
*H04J 1/16* (2006.01)
*H04J 3/14* (2006.01)
(52) U.S. Cl. ........................ 370/238; 370/539
(58) Field of Classification Search ............... None
See application file for complete search history.

(56) References Cited

U.S. PATENT DOCUMENTS

| | | | |
|---|---|---|---|
| 5,412,652 A * | 5/1995 | Lu ............................ 370/223 |
| 6,205,154 B1 * | 3/2001 | Schmidt et al. ............. 370/458 |
| 6,925,054 B1 * | 8/2005 | Atterton et al. ............. 370/218 |
| 2001/0053149 A1 * | 12/2001 | Mo et al. .................... 370/389 |

* cited by examiner

*Primary Examiner*—Chirag G. Shah
(74) *Attorney, Agent, or Firm*—Sawyer Law Group LLP

(57) ABSTRACT

A method and system for selecting ring paths in service provisioning on optical networks including a plurality of interconnected rings. The method includes: receiving a request to provision a service between a first end point and a second end point in the optical network; identifying a plurality of possible ring paths between the first and second end points; validating a bandwidth of each ring path, including validating bandwidths of bandwidth bottlenecks in each ring path; selecting a path from the validated ring paths; and provisioning the service on the selected path. The system utilizes a path engine on a network management server that knows about the bandwidth allocation in the entire network and implements the method. The resources of the optical network used by the provisioned service is thus minimized.

25 Claims, 6 Drawing Sheets

PATH ENGINE FOR OPTICAL NETWORK

FIELD OF THE INVENTION

The present invention relates to optical networks, and more particularly to the selection of ring paths in service provisioning on optical networks.

BACKGROUND OF THE INVENTION

FIG. 1 illustrates a conventional optical network. The network includes a plurality of interconnected optical rings 101-103. Each ring includes a plurality of nodes 104, also known as shelves. Two rings may be interconnected through a common node, such as node 105, also known as an internal interconnect. Two rings may also be connected through an external interconnect between nodes on each ring.

Occasionally, services must be provisioned on the network. During the provisioning process, a path between two end points, through nodes, rings and interconnects, must be determined. The selection of the path is based upon the available resources necessary for the service and the service parameters. One important resource is bandwidth. As the multiplexing of different services on an optical network becomes more popular, the effectiveness of bandwidth management in service provisioning becomes more important. If the service provisioning is inefficient, then bandwidth can be wasted, costing money.

An example of inefficient provisioning is not routing each service over the shortest available path between its endpoints. This causes fewer services to fit in a given network than could be possible.

As another example, some service have higher priority than others. In provisioning high priority services on conventional optical networks, bandwidth is guaranteed by using dedicated connections, even though the full bandwidth of the dedicated connection is not always in use. This utilizes available bandwidth inefficiently.

Accordingly, there exists a need for an improved method and system for selecting ring paths in service provisioning on optical networks. The method and system should minimize the resources utilized by a service. The present invention addresses such a need.

SUMMARY OF THE INVENTION

A method and system for selecting ring paths in service provisioning on optical networks including a plurality of interconnected rings. The method includes: receiving a request to provision a service between a first end point and a second end point in the optical network; identifying a plurality of possible ring paths between the first and second end points; validating a bandwidth of each ring path, including validating bandwidths of bandwidth bottlenecks in each ring path; selecting a path from the validated ring paths; and provisioning the service on the selected path. The system utilizes a path engine on a network management server that knows about the bandwidth allocation in the entire network and implements the method. The resources of the optical network used by the provisioned service is thus minimized.

DETAILED DESCRIPTION

The present invention provides an improved method and system for selecting ring paths in service provisioning on optical networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention provide path selection in service provisioning, such that the resources of the optical network used by the provisioned service is minimized. The system utilizes a path engine on a centralized network management server that knows about the bandwidth allocation in the entire network. The path engine determines the possible paths between two end points in the network, and validates each path for available bandwidth. The service is disallowed if there are no paths between the end points with sufficient bandwidth.

To more particularly describe the features of the present invention, please refer to FIGS. 2 through 6 in conjunction with the discussion below.

Figure 1:
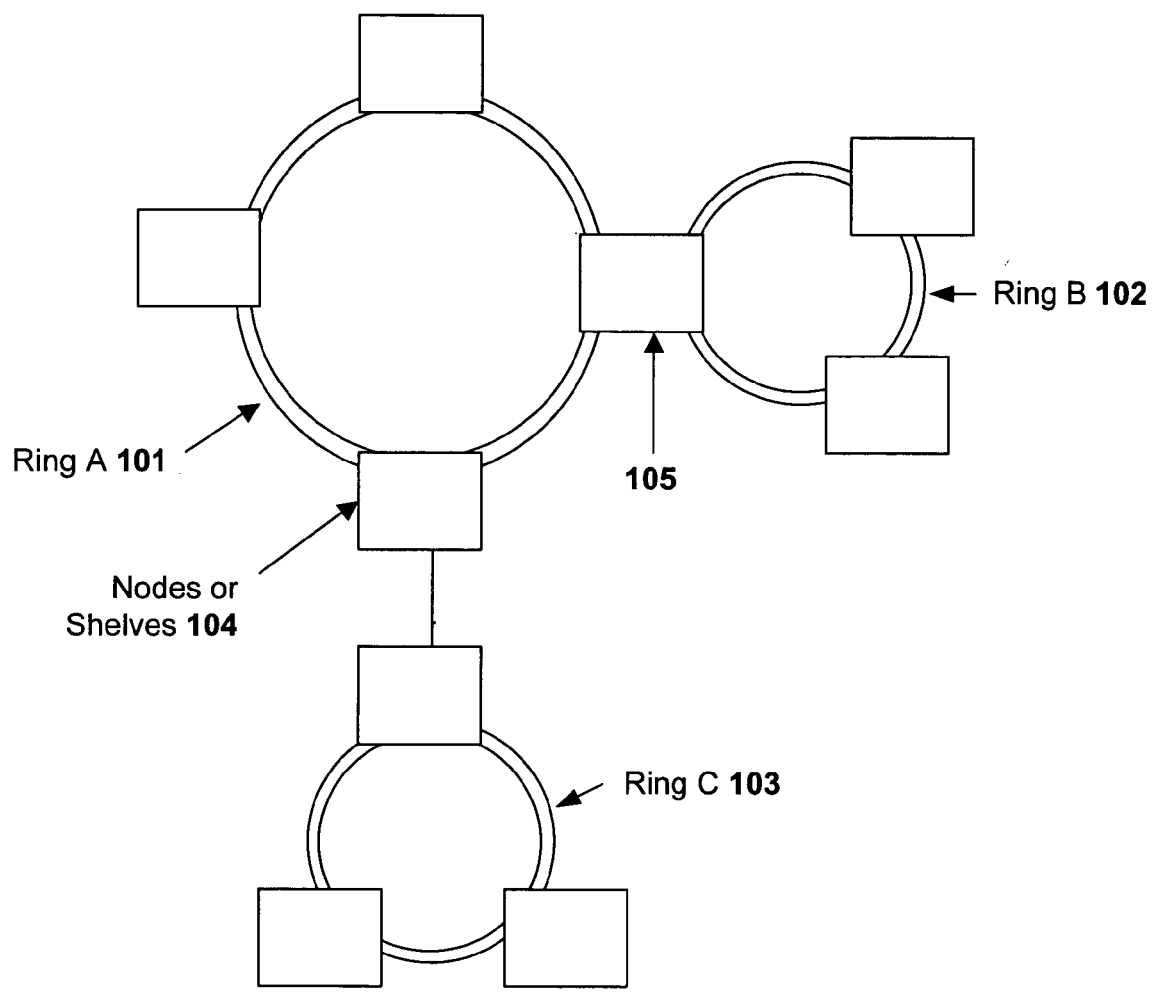
FIG. 1 illustrates a conventional optical network.
Figure 2:
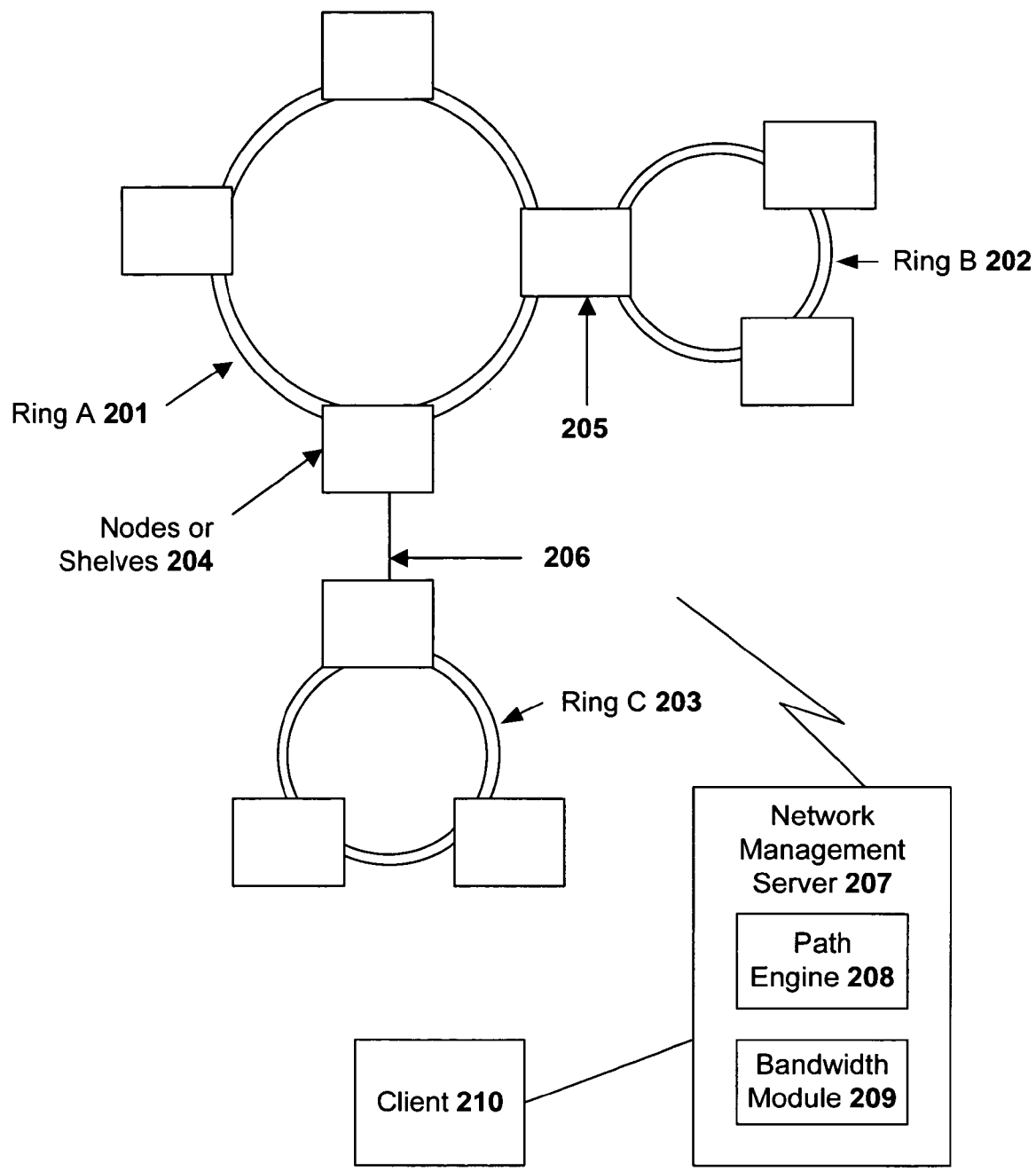
FIG. 2 illustrates a preferred embodiment of a system for selecting ring paths in service provisioning on optical networks in accordance with the present invention.

FIG. 2 illustrates a preferred embodiment of a system for selecting ring paths in service provisioning on optical networks in accordance with the present invention. The network includes a plurality of interconnected rings 201-203. Each ring in turn includes several connected nodes or shelves 204. A node is a physical entity which transfers traffic between customers and the network. Each node could contain several cards. A card in turn could contain multiple "customer facing" or "user" ports. Cards can be of various different types—i.e., contain ports of a particular type or a particular mix of port types.

A ring is a series of nodes connected together in a circular topology. Rings can be of different speeds (e.g., 1 Gbps, 2.5 Gbps, etc.). A ring includes two counter rotating rings made of optical fiber. Each ring can contain several nodes of different types. The attachment point of a node onto the ring is termed a "ring port". A ring port is a logical entity comprised of two physical ports—one to attach to each side of the ring. A ring port is contained by a "ring card". The on/off ramp to the ring on the ring card may or may not be divided into multiple lanes called "channels".

A ring interconnect is defined as a pair of adjacent ring ports on different rings. The interconnects between rings could be of two types (from the perspective of a shelf)—internal and external. An internal interconnect is formed between two rings when they share a common node—data can flow between these two rings via the midplane of this common node. An eternal interconnect is formed by taking one node on each of the two rings, and connecting together a "customer facing" or Ethernet user port on each of the two nodes.

Figure 3:
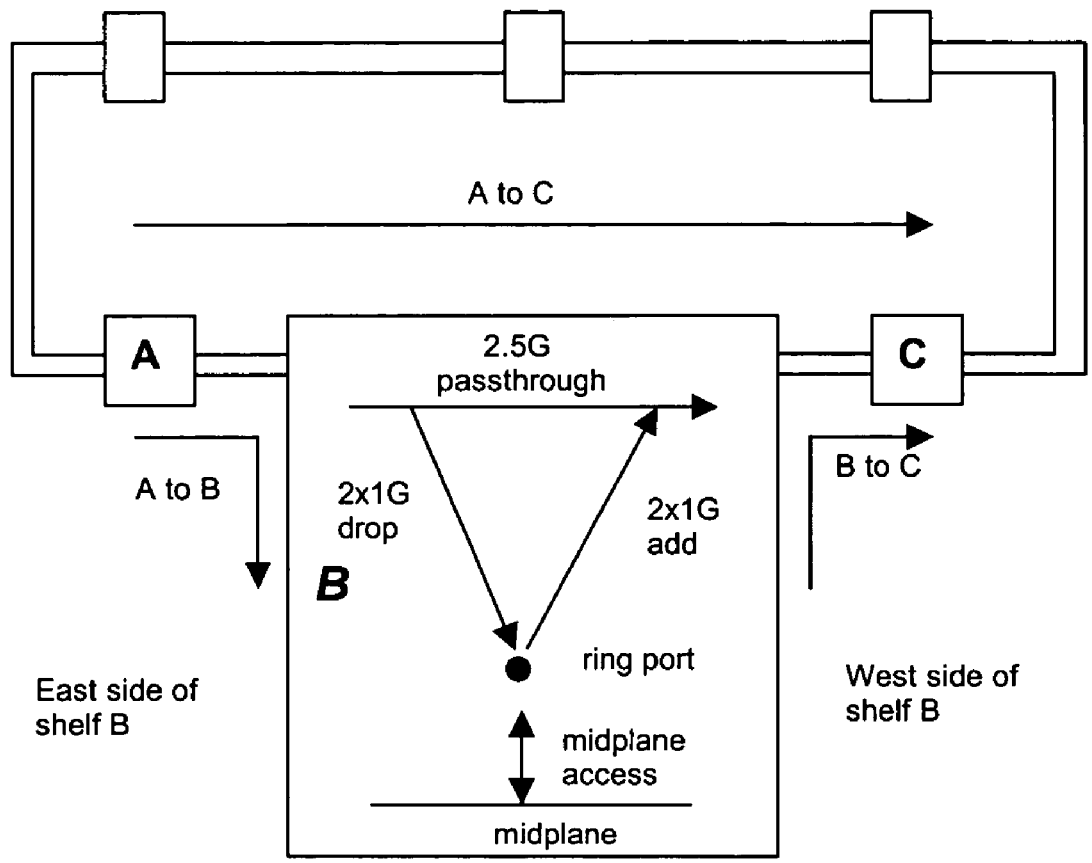
FIG. 3 illustrates in more detail a node in an optical network in accordance with the present invention.

FIG. 3 illustrates in more detail a node in an optical network in accordance with the present invention. FIG. 3 illustrates an east to west flow for nodes A, B, and C. For the sake of simplicity, only channel 1 is shown. On each side of the ring some channels add data to the ring while other channels drop data from the ring. Assume that the capacity of the ring is 2.5 Gbps. However, the on/off ramps to each shelf are divided into two channels, each of capacity 1 Gbps. Traffic flowing from node A to node B must flow over one of the two drop channel drawn on the east side of node B. Traffic flowing from node A to node C can bypass node B's channel via the pass through port. Pass through ports are not a limitation in bandwidth allocation. The eight channels (east/west, add/drop, channel1/channel2) combine into a logical entity called a "ring port".

Returning to FIG. 2, the provisioning of services in the network is managed by a network management server 207. During the provisioning process, the path for the service is selected utilizing a path engine 208 at the server 207. The path engine 208 works along side a bandwidth module 209. The bandwidth module 209 is capable of calculating the bandwidth allocated on each bandwidth bottleneck, given the services provisioned in the network. Bandwidth bottlenecks are described further below. A user at a client 210 can request the service and provide various parameters for the service.

In the preferred embodiment, the network is represented in NMS software using an object model. The rings 201-203 are recognized as entities—and represented with a "ring" type object. Interconnections between the rings 201-203 are recognized and represented with a "ring interconnect" type object. Ring interconnects can be either the internal or external type. Each fiber link between a pair of nodes is represented by a separate "linkBW" object. Each channel used to enter or exit a ring from a shelf is represented by a separate "channelBW" object. The object model also maintains the relationships between a ring and all the ring interconnects on it. The object model further maintains the hierarchical relationships between customer facing ports, shelves and rings. A summary bandwidth table is maintained on each node which summarizes the bandwidth reserved for all the services provisioned on that node.

Bandwidth Bottlenecks

Before describing the path selection process in accordance with the present invention, the concept of bandwidth bottlenecks will first be described:

Each of the network components described above with reference to FIGS. 2 and 3 has a particular capacity/bandwidth limit that the path engine 208 understands and enforces. If the amount of traffic flowing on a component exceeds the capacity of that component, then traffic can be dropped. Thus, the path engine 208 knows the capacity of each bandwidth bottleneck in the system, the amount of bandwidth reserved on the bottleneck of provisioned services, and the amount of bandwidth available. These bottlenecks include:

User ports: A physical user or customer facing port has a certain capacity (e.g. 100 Mbps or 1 Gbps for Ethernet ports). This may be further subdivided into logical Ethernet ports each of which can be rate-limited to a user specifiable bitrate. The sum of the bitrates (including some overhead) of all the logical ports contained in a physical port must be less than or equal to the capacity of the containing physical port.

Shelf midplane: The data that flows between the cards belonging to a shelf is carried via the shelf's midplane. Each card has a link to the midplane and this link has a finite bandwidth.

Ring channels: The access to the ring within a shelf may be subdivided into multiple channels, as illustrated in FIG. 3. The optical signal received from the optical fiber is converted into an electrical signal and may have to flow along one of several receive channels each with a limited capacity. The sum of the capacities of the channels is less than or equal to the capacity of the attached fiber. The traffic belonging to a service cannot span multiple channels. All of it must flow on one channel. When a service is provisioned, the channel occupied by it on each shelf it traverses must be specified. A service that traverses multiple rings may occupy a different channel on each ring. As a temporary implementation restriction, the channel used by a service must be the same on each shelf traversed by it within a ring.

Ring spans: A ring is comprised of multiple ring spans. Each span is a pair of optical fibers connecting two adjacent nodes. Each of the two fibers is termed a ring link. One link is for traffic flowing in the clockwise direction and the other link is for traffic flowing in the counter-clockwise direction. Each link has a finite capacity (e.g. 2.5 Gbps).

Internal ring interconnects: A node may be attached to several rings. This allows traffic from these rings to flow among each other via this shelf. The connection between a pair of such rings within a node is termed an "internal ring interconnect". Internal interconnects are comprised of other bandwidth bottlenecks such as ring channels and midplanes.

External ring interconnects: An external ring interconnect is comprised of a user port on each end.

Service Creation

The simplest type of service is a "point-to-point" (PTP) service. A PTP service involves two endpoints each of which is capable of transmitting traffic to the other. The amount of traffic being transmitted by each of the two endpoints could differ from the other. Hence the service is comprised of two "flows"—each flow representing the traffic flowing from one of the endpoints to the other. In the preferred embodiment, as a constraint to simplify the implementation, both sides must traverse the same network components. Typically given a requested PTP service, there can be multiple topological paths between the endpoints. Some (or all) of the paths may not have sufficient bandwidth available to accommodate the requested service. Each candidate path has a "cost" associated with it. The goal of path engine 208 is to find all the candidate paths and either pick the least-cost path, or, if the user would like to pick the path, display the candidate paths to the user. In terms of the network, paths include an ordered list of all the network components the traffic needs to traverse to get between the service endpoints.

The paths are computed in several stages in order to minimize the overall amount of computation and time required to find the best path and provision it. The path engine 208 works alongside the bandwidth module 209 in the management server 207. In addition to being capable of calculating the bandwidth allocated on each bandwidth bottleneck, the bandwidth module 209 is also capable of factoring in the bandwidth for requested services in order to simulate the what-if scenarios generated by the path engine 208.

Figure 4:
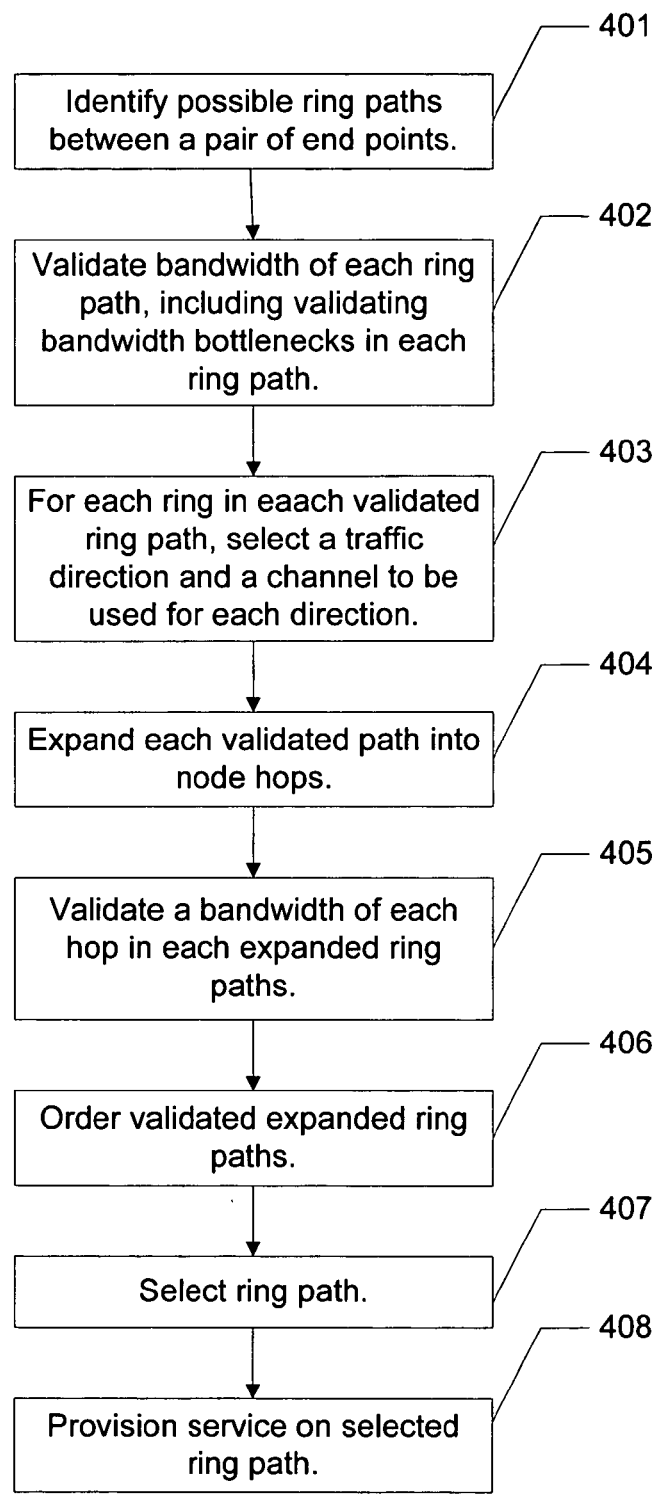
FIG. 4 is a flowchart illustrating a preferred embodiment of the method for selecting ring paths in service provisioning on optical networks in accordance with the present invention.

FIG. 4 is a flowchart illustrating a preferred embodiment of the method for selecting ring paths in service provisioning on optical networks in accordance with the present invention. First, the possible ring paths between a pair of endpoints in the network are identified by the path engine 208, via step 401. A ring path is an ordered list of rings, along with the interconnects between each pair of adjacent rings. Next, the bandwidth of each ring path is validated, including validating the bandwidth for bandwidth bottlenecks in each ring path, via step 402. This includes checking to see if the ring interconnects have enough bandwidth available to accommodate the requested service. In this step, the user ports and their corresponding midplanes can also be validated for bandwidth.

Next, for each validated ring path, the traffic direction in each ring and the channel to be used on each ring are selected, via step 403. The possible directions are east or west, as explained above. For each ring being traversed by the path, the two sides of the service can typically occupy either one side of the ring or the other. Each side therefore needs to be validated for bandwidth. Next, each validated path is expanded into node hops, via step 404. Each hop in the expanded paths is also validated for bandwidth, via step 405. Then, the validated expanded ring paths are ordered, via step 406. In the preferred embodiment, they are ordered based on the cost of the ring paths. Several criteria can be taken into account when considering the cost of a ring path—the simplest being the length of the path. The length of the path is equal to the sum of the ring spans and ring interconnects that make up the path. These paths can then either be shown to the user or the least-cost path can be automatically selected, via step 407. The service is then provisioned on the selected path, via step 408.

Other Factors

Several factors can also be considered in the path selection, as described below:

Spatial Reuse

A ring is composed of two counter rotating rings made of optical fiber. The principal reason for this is to provide protection for services flowing on the ring. If the fiber between two nodes breaks on one side of the ring, the data flowing between them over the break can be redirected over to the other side of the ring. However, in order for this to happen, there needs to be sufficient bandwidth reserved on the "intact" side of the ring for the services that will be steered over.

Figure 5:
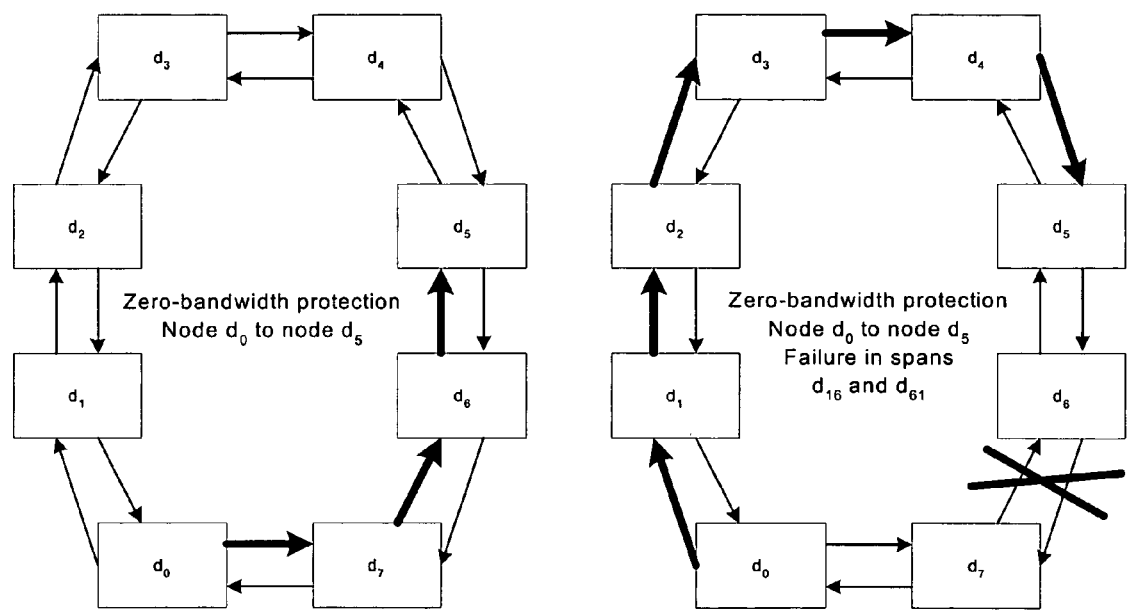
FIG. 5 illustrates spatial reuse in accordance with the present invention.

FIG. 5 illustrates spatial reuse in accordance with the present invention. The left diagram of FIG. 5 illustrates an inter-node shortest-hop physical route taken by traffic from nodes $d_0$ to $d_5$ in zero-bandwidth protection mode, indicated by the heavier arrow. When a failure occurs impacting the shortest-hop physical route, protected traffic is guaranteed use of the longer physical route on the other ring, as illustrated in the right diagram of FIG. 5.

Consequently services can be of two types—protected and unprotected. Unprotected services do not have any protecting bandwidth reserved for them and are dropped in the event of a fiber break. Hence an unprotected service flowing over one side of the ring does not utilize any resources on the other side of the ring.

Protected services do have protecting bandwidth reserved for them and are steered in the event of a fiber break along the data path. The algorithm for the reservation of protecting bandwidth is further describe din the co-pending U.S. Patent Application, entitled "Bandwidth Reservation Reuse in Dynamically Allocated Ring Protection", Ser. No. 09/805,360, filed on Mar. 12, 2001, and assigned to the assignee of the present application. The Applicant hereby incorporates this patent application by reference. The goal of the algorithm is to minimize the amount of reserved protection bandwidth.

Thus, the path engine 208 reserves bandwidth for both protected and unprotected services. When doing connection admission control (CAC) for a service that is about to be provisioned, the path engine 208 checks for bandwidth availability on all the resources that will be utilized. This includes taking into account the protection bandwidth for protected services that has been calculated and reserved by the bandwidth module in the NMS.

Classes of Service

How bandwidth is allocated in the components of a path is impacted by the class of the requested service. A service can be assigned one of at least three different classes of service:

Expedited Forwarding (EF): Services assigned this class of service have priority over the other classes at all bandwidth bottlenecks in the network.

Assured Forwarding (AF): Services in this class of service have priority above BE but below EF.

Best Effort (BE): Services in this class of service have the lowest priority.

Service Overhead

The bandwidth utilized by a service on a component is larger than the amount of bandwidth required for the user traffic payload. This is primarily because the user traffic needs to be packaged along with other information.

For example, consider a DS1 TDM service. It has a payload size of 96 bytes in each frame. To convert this to a packet, assume a hypothetical number of 30 bytes of overhead for items such as ring headers, CRC, start of packet, end of packet, MPLS labels and padding. This makes a packet size of 126 bytes, giving an overhead factor of 126/96=1.3. This converts a user rate of 1.544 Mbps for a DS1 to a ring rate of 2.027 Mbps.

The overhead varies based on the service type. The possible service types fall within three broad categories—point-to-point, point-to-multipoint, and multipoint-to-multipoint service categories. These service categories are described in detail later in this specification. The path engine 208 takes the overhead factor into account when doing service CAC (for services about to be provisioned) as well as bandwidth reservation (for services that have been provisioned).

Bandwidth Oversubscription

Bandwidth oversubscription refers to the situation where the bandwidth allocated to services on a given component in the network exceeds the bandwidth capacity of that component. A distinction needs to be made here between bandwidth "allocated" and bandwidth "utilized". A service may not always be using the bandwidth allocated to the service as its bitrate may fluctuate over time. Typically the bandwidth allocated to a service is the maximum bandwidth it can use at any given time. Due to statistical multiplexing between the multiple services typically flowing over any network component, the total bandwidth utilization may be less than the total bandwidth allocated on that component for all the services. By monitoring network usage, it is possible to estimate the relationship between the amount of traffic allocated and the amount of traffic utilized. This allows the network operator to oversubscribe their network in an intelligent manner.

In the preferred embodiment, the path engine 208 does not allow EF services to be oversubscribed. AF services by default cannot be oversubscribed but may be oversubscribed if the network operator chooses to. An AF "oversubscription factor" can be specified which effectively multiplies the AF available bandwidth of each bandwidth bottleneck by that number. BE services can be oversubscribed as much as the operator wishes to.

Example Service Creation

Figure 6:
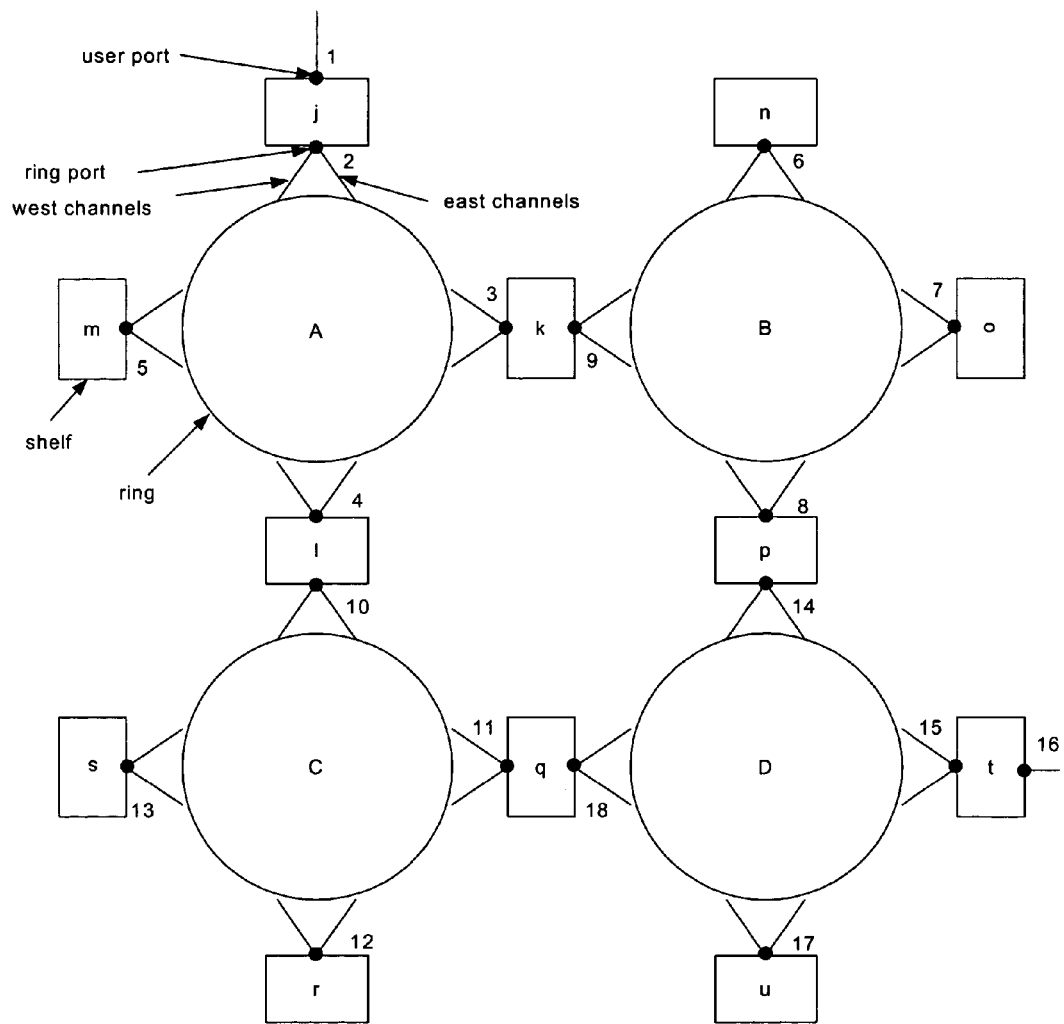
FIG. 6 illustrates an example service provisioning in accordance with the present invention.

FIG. 6 illustrates an example service provisioning in accordance with the present invention. Assume that a service is desired between the following endpoints: UserPort_1 at Shelf_j on Ring_A and UserPort_16 at Shelf_t on Ring_. First, all possible ring paths are found, comprising of rings and ring interconnects, between the pair of end points, via step 401. In this example there are two possibilities:

UserPort_1, RingPort_2, Ring_A, Interconnect_A-B, Ring_B, Interconnect_B-D, Ring_D, RingPort_15, UserPort$_{13}$ 16.

UserPort_1, RingPort_2, Ring_A, Interconnect_A-C, Ring_C, Interconnect_C-D, Ring_D, RingPort_15, UserPort_16.

Next, each ring path is validated for bandwidth, via step 402. The ones that do not have sufficient bandwidth are rejected. User ports, midplanes on shelves containing the user ports, and ring interconnects are validated for bandwidth. Let us assume only one of the two ring paths passes validation:

UserPort_1, RingPort_2, Ring_A, Interconnect_A-B, Ring_B, Interconnect_B-D, Ring_D, RingPort_15, UserPort_16

The expanded ring path is:

Shelf_j, UserPort_1, RingPort_2, Shelf_k, RingPort-3, RingPort_9, Shelf_p, RingPort_8, RingPort_14, Shelf_t, RingPort_15, UserPort_16.

Next, a channel for each direction of each of the rings is selected, via step 403. Let us consider Ring A, which this involves RingPort_2 on shelf j and RingPort_ on shelf k. There are two options in terms of which side of Ring A to use: east from shelf j and west from shelf k; or west form shelf k and east from shelf k. Assume that shelves on Ring A have two channel numbers. For each of the two sides and each of the two channels, the amount of bandwidth that would be available after the creation of the requested service is checked.

Consider the side of the ring that is east from shelf j and channel 1. The following channels need to be validated:

Forward flow: the traffic flowing from UserPort_1 to UserPort_16 will flow on the east add channel on RingPort_2 and on the west drop channel on RingPort_3.

Reverse flow: the traffic flowing from UserPort_16 to UserPort_1 will flow on the west add channel on RingPort_3 and on the east drop channel on RingPort_2.

If any of the channels have negative available bandwidth after factoring in the requested service, the channel is rejected. If there are multiple valid channel choices, the channel with the most amount of post-service available bandwidth on the most restricting bottleneck is chosen. E.G., the choice involving the side of Ring A that is east from shelf j and channel number 1 includes the four channels enumerated above—each with a post-service available bandwidth number associated with it. The smallest of these numbers is selected as the available bandwidth for this choice. At this point the best channel for each possible side of the Ring A has been selected via a mechanism that attempts to do load balancing among the channels. The channel selection process is repeated for Rings B and D.

Next, the validated ring paths are further expanded based on the directions that passed the channel validation, via step 404. In this example, the service transmits on three rings (Ring A, Ring B, and Ring D). If both sides of each ring have a valid channel, the direction permutations that exist are eight in number. For each direction around the ring the hops (i.e. the links/linkBW objects) required to reach from one end to the other are determined. Each hop is checked to see if it has sufficient bandwidth to fit the service, via step 405.

Next, the bandwidth-validated and expanded paths are ordered in increasing number of hops required to get between the two end user ports. The ordering can be based on a more complex function if so desired. Either the shortest expanded path is selected for provisioning, or the validated paths are displayed to the user as candidate paths and allow the user to select a path of their choice, via step 407. In this example, the ring direction permutation from the perspective of the forward flow) that gives the shortest path is east, west, east on Rings A, B, and D, respectively. However, let us assume that on Ring D, the shortest direction does not have sufficient available bandwidth and the service has to be routed west. The shortest path then is:

Shelf_j, UserPort_1, RingPort_2, Shelf_k, RingPort_3, RingPort_9, Shelf_p, RingPort_8, RingPort_14, Shelf_q, Shelf_u, Shelf_t, RingPort_15, UserPort_16.

Once the path is selected, the service is provisioned on that path, via step 408.

Service Modification

PTP Service Modification

Several parameters may be modified on a PTP service after it is created, including:

Input bitrate on either end for an Ethernet Private Line (EPL).

Class of service.

Protection type.

Bandwidth based connection admission control is done for service modification requests. For each resource being utilized by the service, the bandwidth required for the original service is added back, then the bandwidth required for the modified service is subtracted. If there is bandwidth available for the modified service, the service modification is allowed.

Service Categories

Although the example above describes the provisioning of a PTP service, one of ordinary skill in the art will understand that "point to multipoint" (PTMP) and "multipoint to multipoint" (MPTMP) services can also be provisioned without departing from the spirit and scope of the present invention.

A PTP service has only two endpoints, such as Ethernet Private Line (EPL) or TDM Private Line services. A PTMP service has one input point but multiple output points, such as video Transport Service (VTS), where one port injects a video-signal into the network and multiple output ports receive the signal. MPTMP services have multiple endpoints, each of which is capable of transmitting to and receiving from all the other endpoints, such as Transparent LAN service (TLS), where the endpoints are Ethernet ports. Each endpoint can have a different speed, capacity, or bitrate.

In the preferred embodiment, PTMP service creation is similar to PTP service creation with a few differences.

PTMP services have a one-way traffic from the input port to all the output ports. Traffic may be multicast on a ring whereby it traverses all the way around the ring. Candidate paths are not presented to the user. Shortest path is the only automatic option available to the user.

PTMP service modification is similar to PTP service modification. The modification operations allowed include:
Input port bitrate modification.
Changing the input port.
Adding or removing output ports.
Changing class of service.
Changing protection type.

In the preferred embodiment, MPTMP service creation is similar to PTP and PTMP service creation with a few differences. Multiple ports participate in an MPTMP service, all of which are transmitting to all other ports. The paths involve: a PTMP path from each port to all other ports; and a PTP path between each pair of ports. Candidate paths are not presented to the user. Shortest path is the only automatic option available to the user.

MPTMP service modification is similar to PTP and PTMP service modification. The modification operations allowed include:
User port bitrate modification.
Adding or removing ports.
Changing class of service.
Changing protection type.

Conclusion

The method and system in accordance with the present invention provide path selection in service provisioning, such that the resources of the optical network used by the provisioned service is minimized. The system utilizes a path engine on a centralized network management server that knows about the bandwidth allocation in the entire network. The path engine determines the possible paths between two end points in the network, and validates each path for available bandwidth. The service is disallowed if there are no paths between the end points with sufficient bandwidth.

Although the present invention has been described in accordance with embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for selecting ring paths in service provisioning on an optical network, the optical network comprising a plurality of interconnected rings, the method comprising:
   receiving a request to provision a service between a first end point and a second end point in the optical network;
   identifying a plurality of possible ring paths between the first end point and the second end point;
   validating a bandwidth of each ring path, comprising
      validating bandwidths of bandwidth bottlenecks in each ring path, the bandwidth bottlenecks comprising user ports, midplanes in shelves containing the user ports, and ring interconnects in each ring path;
      for each ring in each validated ring path, selecting a traffic direction and a channel to be used for each traffic direction;
   expanding each validated ring path into node hops; and
   validating a bandwidth of each hop in each expanded ring path;
   selecting a ring path from the validated ring paths; and
   provisioning the service on the selected ring path, including provisioning the service through the selected traffic direction and the channel associated with each ring in the selected ring path.

2. The method of claim 1, wherein each of the plurality of possible ring paths comprises rings and ring interconnects.

3. The method of claim 1, wherein validating a bandwidth of each hop in each expanded ring path comprises validating a bandwidth of each ring span in each expanded ring path.

4. The method of claim 1, wherein selecting a ring path from the validated ring paths comprises:
   ordering the validated ring paths according to a cost of each path; and
   selecting a ring path having a lowest cost.

5. The method of claim 1, wherein bandwidth is reserved for protected services and unprotected services on the bandwidth bottlenecks.

6. The method of claim 1, wherein the service is assigned an expedited forwarding class of service, wherein the service has priority over other classes at the bandwidth bottlenecks.

7. The method of claim 1, wherein the service is assigned an assured forwarding class of service, wherein the service has priority over other services assigned a best effort class of service at the bottlenecks, but has priority below other services assigned an expedited forwarding class of service at the bandwidth bottlenecks.

8. The method of claim 1, wherein the service is assigned a best effort class of service, wherein the service has a lower priority than other services not assigned the best effort class of service at the bandwidth bottlenecks.

9. The method of claim 1, wherein bandwidth allocated to the service on a component in the selected ring path exceeds a bandwidth capacity of the component.

10. The method of claim 1, wherein the service is a point-to-point service.

11. The method of claim 1, wherein the service is a point-to-multipoint service.

12. The method of claim 1, wherein the service is a multipoint-to-multipoint service.

13. A computer readable medium encoded with a computer program for selecting ring paths in service provisioning on an optical network, the optical network comprising a plurality of interconnected rings, the computer program comprising computer executable instructions for:
   receiving a request to provision a service between a first end point and a second end point in the optical network;
   identifying a plurality of possible ring paths between the first end point and the second end point;
   validating a bandwidth of each ring path, comprising
      validating bandwidths of bandwidth bottlenecks in each ring path, the bandwidth bottlenecks comprising user ports, midplanes in shelves containing the user ports, and ring interconnects in each ring path;
      for each ring in each validated ring path, selecting a traffic direction and a channel to be used for each traffic direction;
   expanding each validated ring path into node hops; and
   validating a bandwidth of each hop in each expanded ring path;
   selecting a ring path from the validated ring paths; and
   provisioning the service on the selected ring path, including provisioning the service through the selected traffic direction and the channel associated with each ring in the selected ring path.

14. The computer readable medium of claim 13, wherein each of the plurality of possible ring paths comprises rings and ring interconnects.

15. The computer readable medium of claim 13, wherein the computer executable instructions for validating a bandwidth of each hop in each expanded ring path comprises computer executable instructions for validating a bandwidth of each ring span in each expanded ring path.

16. The computer readable medium of claim 13, wherein the computer executable instructions for selecting a ring path from the validated ring paths comprises computer executable instructions for:
    ordering the validated ring paths according to a cost of each path; and
    selecting a ring path having a lowest cost.

17. The computer readable medium of claim 13, wherein bandwidth is reserved for protected services and unprotected services on the bandwidth bottlenecks.

18. The computer readable medium of claim 13, wherein the service is assigned an expedited forwarding class of service, wherein the service has priority over other classes at the bandwidth bottlenecks.

19. The computer readable medium of claim 13, wherein the service is assigned an assured forwarding class of service, wherein the service has priority over other services assigned a best effort class of service at the bottlenecks, but has priority below other services as signed an expedited forwarding class of service at the bandwidth bottlenecks.

20. The computer readable medium of claim 13, wherein the service is assigned a best effort class of service, wherein the service has a lower priority than other services not assigned the best effort class of service at the bandwidth bottlenecks.

21. The computer readable medium of claim 13, wherein bandwidth allocated to the service on a component in the selected ring path exceeds a bandwidth capacity of the component.

22. The computer readable medium of claim 13, wherein the service is a point-to-point service.

23. The computer readable medium of claim 13, wherein the service is a point-to-multipoint service.

24. The computer readable medium of claim 13, wherein the service is a multipoint-to-multipoint service.

25. A system comprising:
    a network management server coupled to an optical network, the optical network comprising a plurality of interconnected rings; and
    a path engine residing at the network management server, wherein the path engine provisions services on the optical network, wherein the path engine is configured to:
        receive a request to provision a service between a first end point and a second end point in the optical network,
        identify a plurality of possible ring paths between the first end point and the second end point,
        validate a bandwidth of each ring path, comprising
            validating bandwidths of bandwidth bottlenecks in each ring path, the bandwidth bottlenecks comprising user ports, midplanes in shelves containing the user ports, and ring interconnects in each ring path;
            for each ring in each validated ring path, selecting a traffic direction and a channel to be used for each traffic direction;
            expanding each validated ring path into node hops; and
            validating a bandwidth of each hop in each expanded ring path;
        select a ring path from the validated ring paths, and
        provision the service on the selected ring path, including provisioning the service through the selected traffic direction and the channel associated with each ring in the selected ring path.

* * * * *